United States Patent [19]
Newstead

[11] 3,740,566
[45] June 19, 1973

[54] LINING WEAR INDICATORS
[75] Inventor: Charles Newstead, Walsall, England
[73] Assignee: Girling Limited, Birmingham, England
[22] Filed: June 23, 1971
[21] Appl. No.: 155,700

[30] Foreign Application Priority Data
June 26, 1970 Great Britain.................. 31,004/70
Sept. 25, 1970 Great Britain.................. 45,697/70
Jan. 16, 1971 Great Britain.................... 2,210/71

[52] U.S. Cl............ 307/10 R, 200/61.4, 340/52 A, 340/52 F
[51] Int. Cl. ............................................. H01h 3/16
[58] Field of Search.............. 200/61.4, 52 A, 52 F; 340/58, 52 A, 52 F; 307/10 R; 188/1 A

[56] References Cited
UNITED STATES PATENTS
3,321,045  5/1967  Veilleux........................... 340/52 A
2,571,360  10/1951  Hallerberg........................ 340/52 F
3,339,676  9/1967  Quinn.............................. 340/52 A
3,605,085  9/1971  Fiorita et al...................... 200/61.4

Primary Examiner—Robert K. Schaefer
Assistant Examiner—M. Ginsburg
Attorney—Scrivener, Parker, Scrivener & Clarke

[57] ABSTRACT

A brake lining wear indicator comprises a preferably normally closed switch. The switch can be operated by feelers in a disc brake or the switch can be incorporated in a tie. The normally closed switches are connected in series to a relay preferably having a delayed action.

15 Claims, 12 Drawing Figures

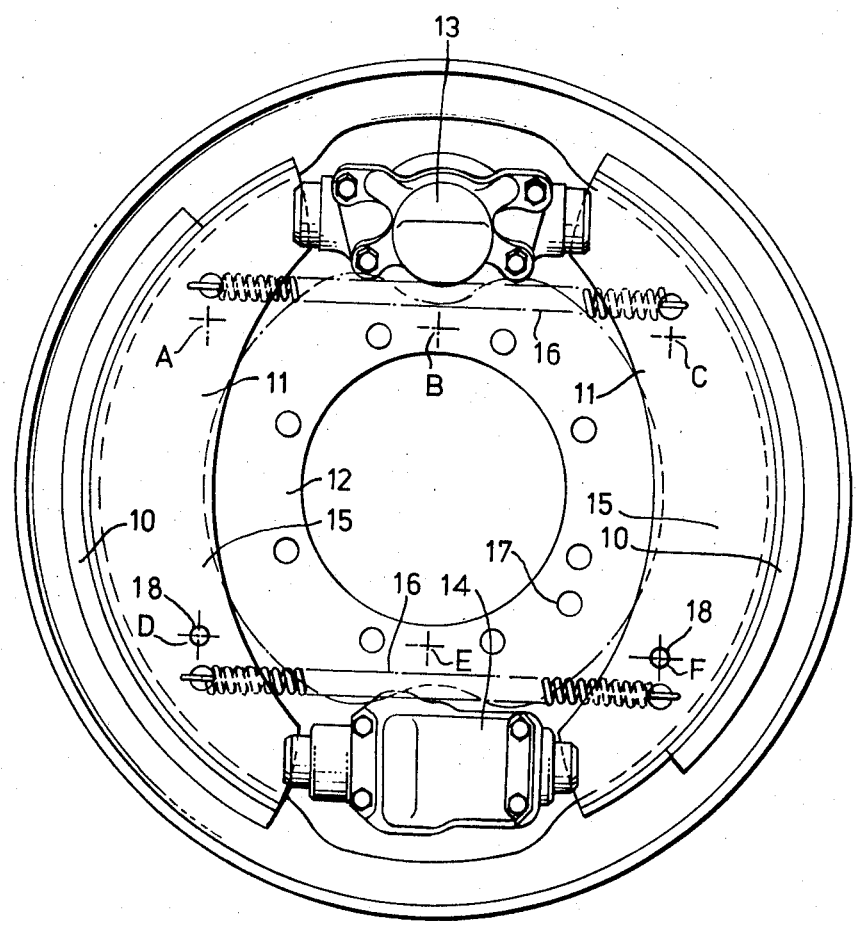
-FIG. 1.-

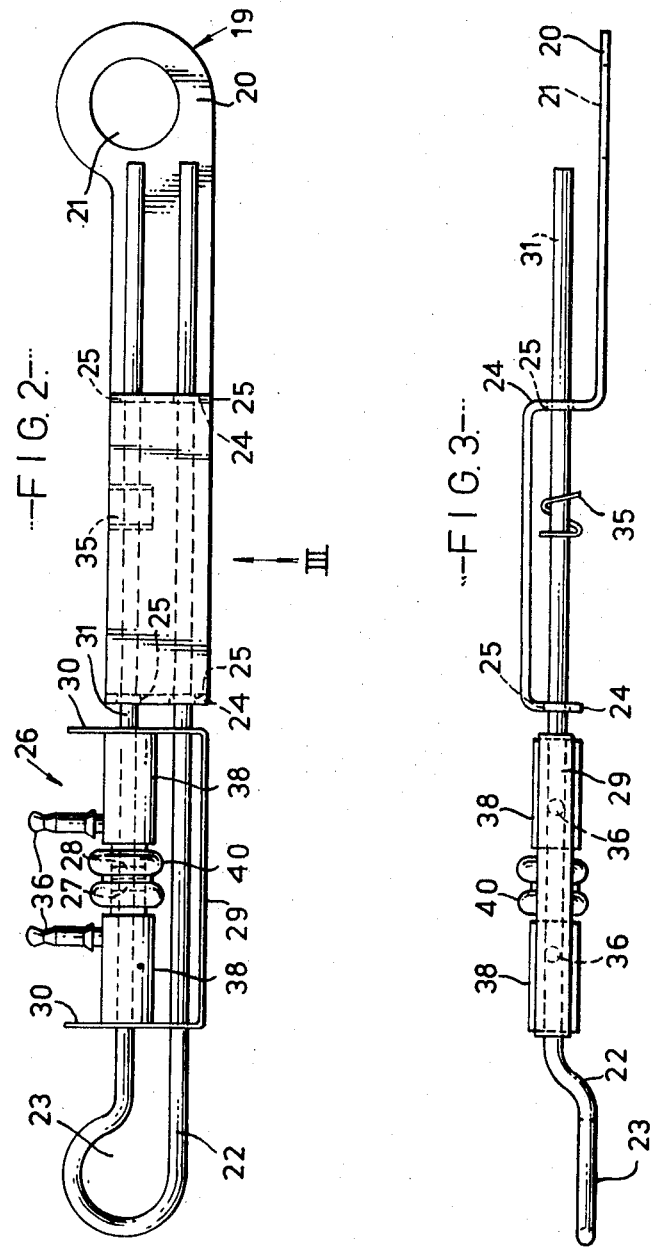

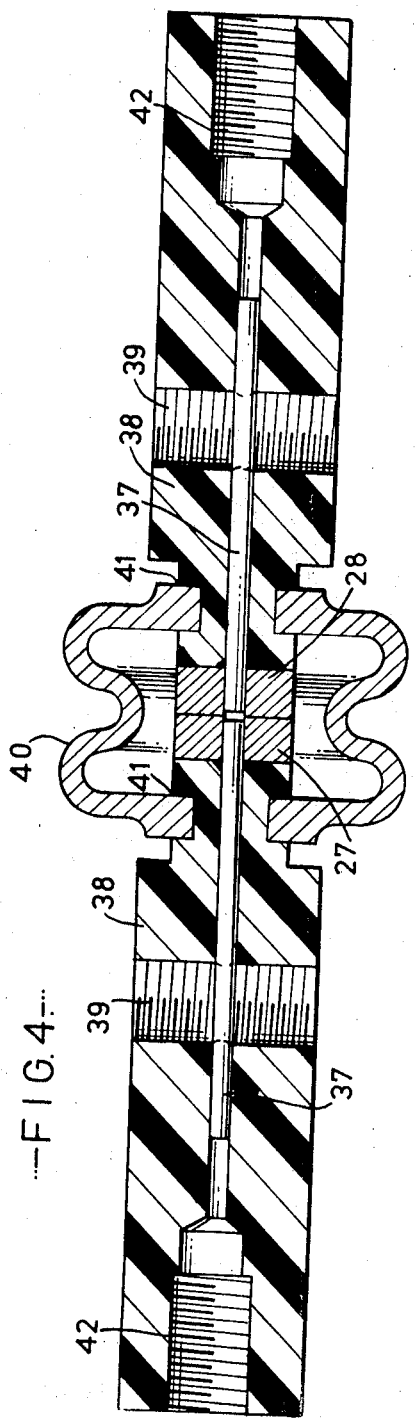
FIG.4.—
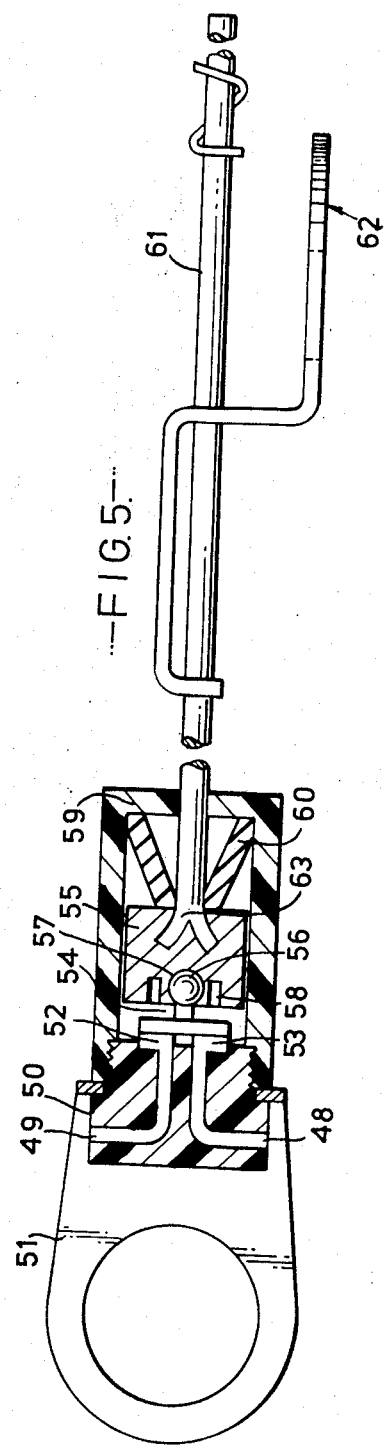
FIG.5.—

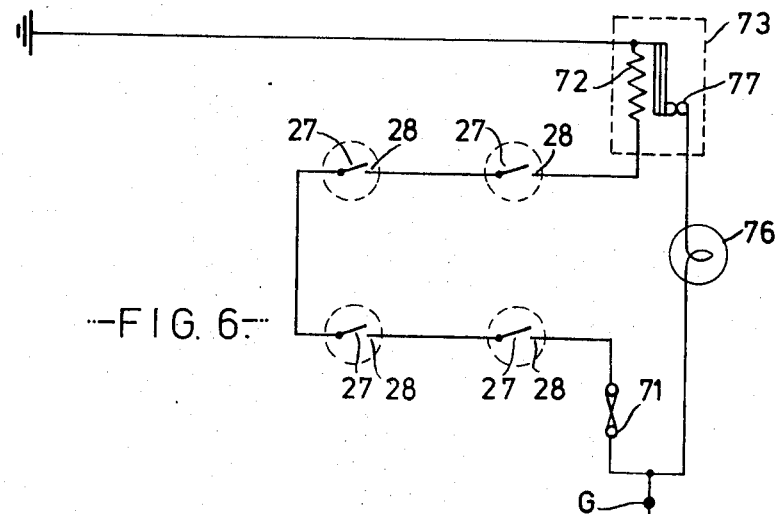
-FIG. 6.-
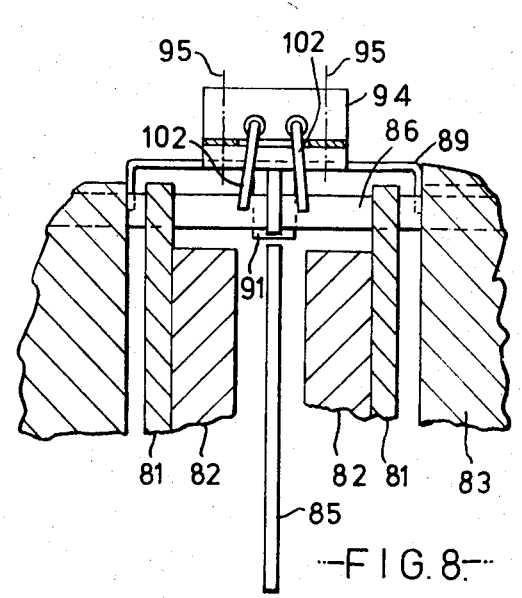
-FIG. 8.-

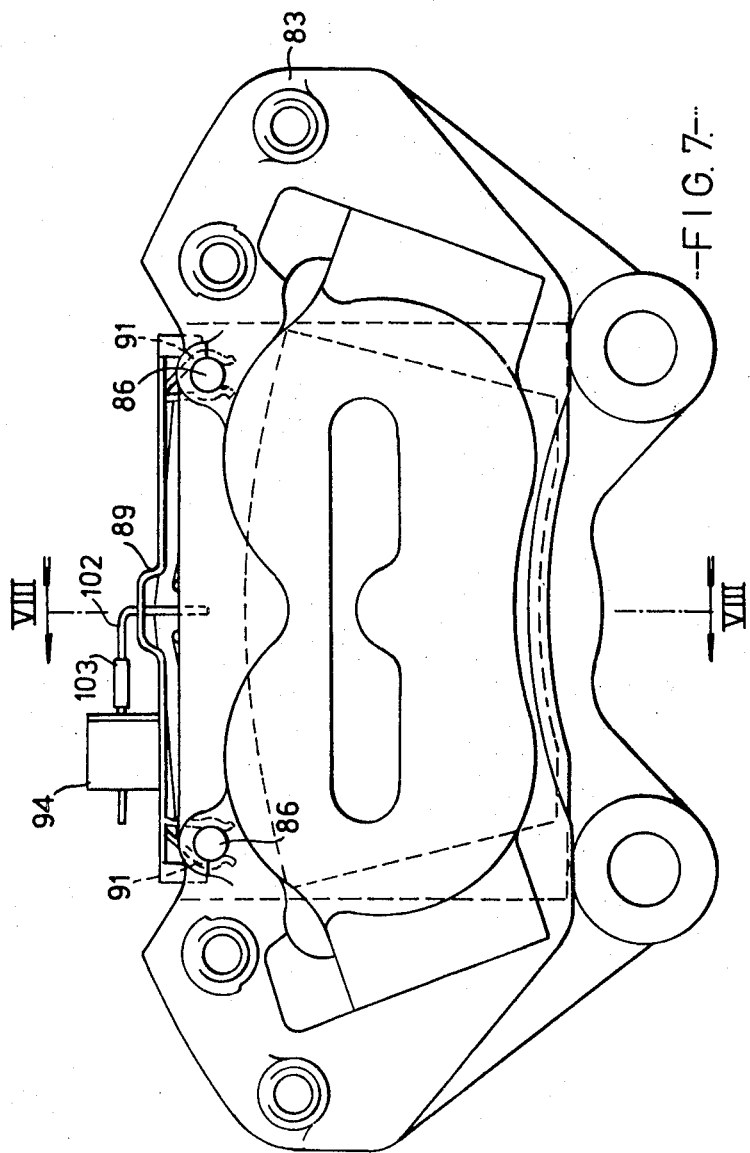

LINING WEAR INDICATORS

The present invention relates to brake lining wear indicators.

The object of the present invention is to provide a vehicle brake lining wear indication system in which each brake has at least one reusable wear indicator having at least a pair of contacts which are normally spring-biassed together and in which the contacts are arranged in a series circuit which operates a means such that a break in the series circuit causes an indication.

Embodiments of the invention will now be described, by way of example with reference to the accompanying drawings.

FIG. 1 is a face view on a drum brake showing locations A, B, C, D, E and F where lining wear indicators can have their ends attached, FIG. 2 is a face view on a lining wear indicator, FIG. 3 is a side view taken in the direction of arrow III of FIG. 2, FIG. 4 is an enlarged cross-sectional view of an electrical switch shown in FIGS. 2 and 3, FIG. 5 is a face view showing an alternative construction to that illustrated in FIG. 2 but with the right hand side of the indicator rotated through a right angle, the figure being shown in section, FIG. 6 is an electrical circuit showing a plurality of indicator switches connected in series, FIG. 7, a side view of an actuating mechanism of a disc brake omitting for simplicity anti-rattle springs and retaining clips, FIG. 8, a detail section on line VIII—VIII of FIG. 7, FIG. 9, a plan view on the actuating mechanism of FIG. 7, FIG. 10, a section in plan on an enlarged scale of a limit switch used in the actuation mechanism of FIG. 7, FIG. 11 is another circuit diagram, and FIG. 12 is another circuit diagram.

DETAILED DESCRIPTION OF THE EMBODIMENTS

Figure 9:
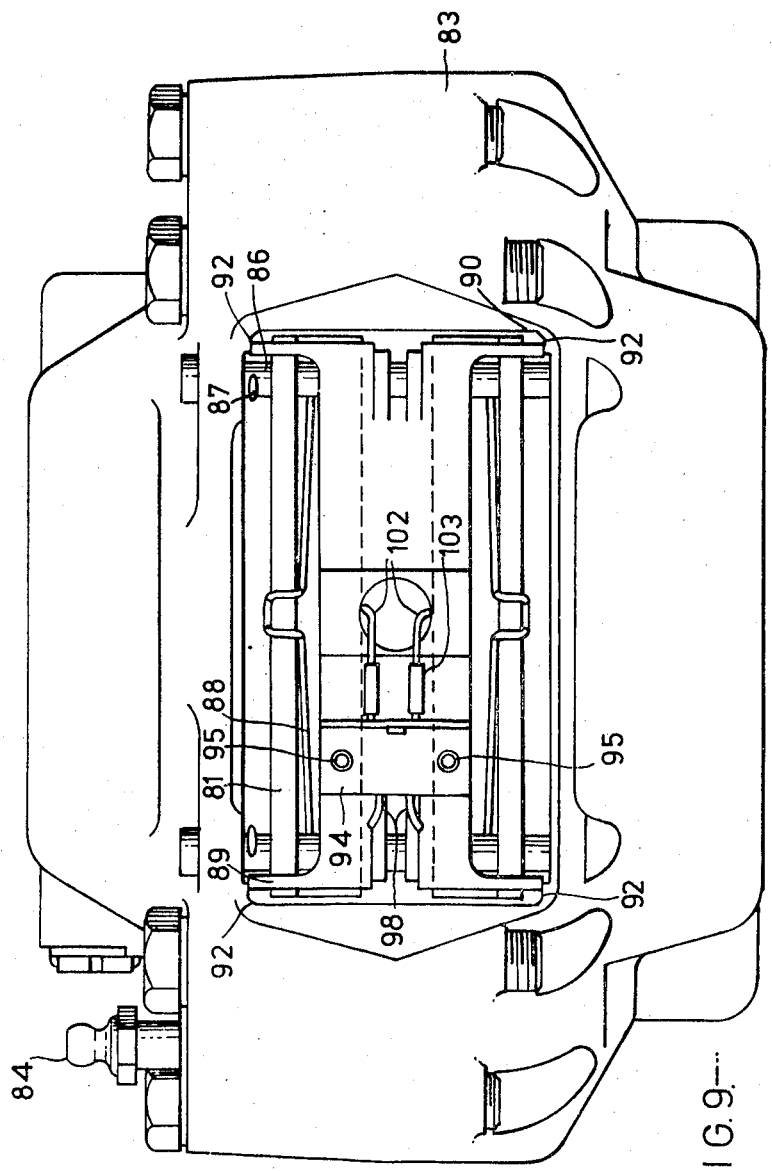

FIG. 1 is a face view on a drum brake of which a brief description will be given. Two arcuate friction assemblies 11 are carried from a torque or backing plate 12 and are movable relative thereto by an actuator 13 and an adjustor 14. The friction assemblies each consists of a carrier 15 and at least one frictional shoe, lining or pad 10 integrally attached thereto. These frictional assemblies are pulled together away from a drum (not shown) by pull-off springs 16. The invention is applicable to most, if not all, types of drum brakes and no benefit is to be gained by amplifying this description of a drum brake.

The only modifications to the standard components of a drum brake entailed by the present invention, are the provision of a hole 17 for electrical leads (or like signal transmitting provision) in the torque or backing plate 12, attachment points such as holes or studs 18 in or on the carriers 15, and the optional fitting of a wear indicator 19 (FIG. 2). The provision of holes 17 and holes or studs 18 is very inexpensive and can be incorporated at little cost in standard production runs.

Depending on the information required, the wear indicator can be fitted between a number of positions. For detecting the need for adjustment a suitable position is between A and C but if one brake lining is likely to wear faster it may be preferred to fit the indicator between a fixed position on the backing plate such as position B and either or both of positions A and C. With sliding shoe brakes, the position B should be on the perpendicular line to the sliding face passing through the respective position A or C. There may be separate positions B for indicators connected to positions A or C. For detecting the need for brake shoe replacement positions D and F are suitable or position E with one or both of positions D and F. A plurality of indicators can be fitted to a single brake and connected in series to indicate a single fault or in parallel to indicate total failure.

With some types of adjustor it may be possible to isolate the indicator from the amount of adjustment by connecting the indicator between a part of the adjustor or something that moves with adjustment of the adjustor and the brake shoe; this is particularly convenient with a brake using an adjustor acting between the shoe and tappet.

The wear indicator 19 is a separate fitting which can be secured between two carriers by suitable means such as bolts, pins or clips very easily and thus the cost of fitting a wear indicator 19 is very low.

The wear indicator 19 shown in FIGS. 2 and 3 is basically a link comprising a double-cranked plate 20 having an attachment hole 21 and a hairpin rod member 22 with a looped end 23 forming an attachment means. Cranked portions 24 of the plate 20 have holes 25 in them for receiving one end of the rod member 22 and therefore act as a device whereby the link can be varied in length to conform to movement of the friction assemblies. The link also includes a switch 26, comprising two contacts 27 and 28 held abutting each other by a spring clip 29 whose resilient end flanges 30 are apertured so the clip is held non-rotationally on the rod member 22 which passes through the apertures. The contact 27 is carried on, but insulated from, an end of the rod member 22 and the contact 28 on, but insulated from, an end of a further rod member 31 which passes through an aperture in an end flange 30 into holes on the cranked portions 24. Fitted onto the rod member 31 between the portions 24 is a helical adjustable stop 35, which when compressed slides freely on the rod member but when allowed to expand clamps itself to the rod member. The spring clip 29 and the rod member 31 and the stop 35 provide a device for sensing excessive variation of the length of the link in that the stop 35 in cooperation with the portion 24 nearer the contacts acts as a lost motion device which is adjustable to the maximum permissible wear and when this is exceeded the contacts 27 and 28 are separated to provide a signal on terminals 36 signifying that the link is of excessive length.

FIG. 4 shows in detail the mounting of the contacts 27 and 28. These are welded to conductors 37 and are attached on insulating bodies 38 having through axial bores in which the conductors extend. Holes 39 are drilled and tapped in these bodies through the conductors 37 for the terminals 36 to be screwed in and make contact with the conductors 37. A boot-like shroud 40 seats in grooves 41 in the bodies and protects the contacts against dirt. The ends of the insulating bodies to which the conductors 37 do not extend have tapped holes 42 to receive the threaded ends of the rod members 22 and 31.

The design of the plate 20 is such that the distance between the portions 24 allows for the maximum range of permissible wear for a wide range of brakes and for the length necessary for the stop and its manipulation. The distance between the hole 21 and the nearer portion 24 is preferably as large as possible since this distance is necessary not only to allow the rod members to extend along it during normal use without the rod members freeing themselves from the holes 25 but also to allow the link to be used with differing brake diameters.

In the embodiment of FIG. 5 the two wear indicators leads 48 and 49 are led into an insulating block 50 attached to a link 51 which can be attached to one of the brake shoes. The two leads 48 and 49 terminate in contact surfaces 52 and 53 which can be bridged by a contact 54 carried by a piston-like block 55 of a resilient material such as hard rubber. The contact 54 is connected to this block by means of a knuckle joint formed by a ball 56 carried from the contact fitted into a spherical bearing 57 in the block. The resiliency of the block can be modified by an annular slot 58 surrounding the spherical bearing. The block slides in a piston-like manner, in a cylindrical housing 59 connected to the block 50, against the bias exerted by a weak elastomeric compression spring 60 which also acts as a dirt-excluding seal. A wire coil spring could be used with or without a suitable internal or external seal. The block is displaceable in the housing by a rod 61 anchored in the block and extending towards a lost motion device 62 whose other end is secured to the other brake shoe. The block is moulded around a bifurcated end 63 of the rod or the rod otherwise connected to the block.

Whilst in the preferred embodiments illustrated, the indicator extends between two friction assemblies it is apparent that a separate wear indicator could be used for each friction assembly, with the indicators attached between the friction assemblies and an anchorage on the torque plate or a single wear indicator could be fitted to the friction assembly more likely to wear and an anchorage on the backing plate.

Brake shoes of drum brakes follow a complex motion as wear proceeds depending in part whether the wear is taken up by an adjustor or by increasing the stroke of the actuator. It will be found that the wear indicator can be located so that it is not affected unduly by this. If the design of brake is such that one or other end of the lining wears more than the other, it may be advisable to take this into consideration in the location of the wear indicator.

It is possible to arrange the spring clip 29 so that it fails when the contacts are separated (or approached to each other). For example the clip could incorporate weak retaining springs engaging a peripheral rib on one or each contact (somewhat similarly to the springs in a press-stud) and relative movement of the contacts could snap these retaining springs from the rib to disable the resiliency of the clip 29. Moreover insulating means could be sprung between the contacts.

The invention comprehends a construction consisting of two strips of a resilient plastics material each having a corrugation on one end, the two corrugations meshing and the contacting surfaces being metallized and held together by a resilient clip. At least one of the strips would have at least one corrugation which could be pulled out straight to provide the lost motion before the two meshing corrugations were forced to part and break contact between the metallization. In this construction, there would be rubbing contact between the metallization to keep the surface clean and the metallization would be wedged apart only when all the lost motion had been utilized.

FIG. 6 shows a circuit for use with wear indicators of the types illustrated in FIGS. 2 to 4 or FIG. 5 with normally closed pairs of contacts 27 and 28. A normally closed pair of contacts 27 and 28 is associated with each brake and these are connected by a single conductor in series with each other, with a fuse 71 and with a heater coil 72 of a thermal relay 73 across a battery 74 and an ignition switch 75. Also connected across the battery and the ignition switch are an indicator lamp 76 and contacts 77 of the thermal relay (these contacts being closed when the relay is cold). The lamp will be located in the cab of the vehicle.

On switching on the ignition for the vehicle, the indicator lamp glows until the relay warms up and thus indicates the circuit is sound. If any of the pairs of contacts opens or if the fuse fails, the heater is no longer energized and the thermal relay trips so the lamp glows, the same happens if a break occurs in the circuit.

It will be appreciated that the wear indicator denotes excessive length of a link interconnecting the friction assemblies and that an initial indication of excessive wear and need for adjustment will be given during brake actuation re-occurring during each actuation and an indication that the maximum account of adjustment has taken place will result in a continuous signal. Thus if a brake is fitted with an adjustment need indicator and an amount of adjustment indicator, it is possible to identify which indicator is open-circuited. With automatic adjusters, a signal re-occurring during each brake actuation indicates a faulty adjuster.

It will be appreciated that this circuit is easy to install and costs very little.

For safety, it may be preferred to include a resistor or other current limiting device between points G and H.

Instead of using a thermal relay because it facilitates circuit testing, it is possible to use a conventional relay with normally closed contacts with a low impedance high current circuit element such as a vehicle starter motor between the relay coil and earth and a connection between the relay coil and the circuit element to supply the heavy current to the element. The voltage drop across the element prevents any voltage across the relay coil and so holds the contacts closed for testing.

The invention can be applied to disc brakes and an embodiment will now be described which is particularly suitable for disc brakes.

As can be seen most clearly from FIG. 8, a disc brake has two brake pads 81 with linings 82 in a housing 83. These brake pads are arranged to be urged against opposite sides of a brake disc 85 hydraulically by a fluid introduced by means of a connection 84 (FIG. 9) and the pads slide on pins 86. These pins are retained in the housing by means of clips 87 and have associated with them anti-rattle springs 88, which minimize rattling of the pads 81 on the pins 86.

A cover plate 89 fits on top of an opening 90 in the housing 83 and is retained in place in the housing by means of clips 91 which engage on the pins 86 outside the range of travel of the pads 81. This cover plate is accurately located by machined corners 92 in the opening 90. A limit switch 94 is secured to the cover plate 90 by means of two screws 95 (FIG. 9).

Figure 10:
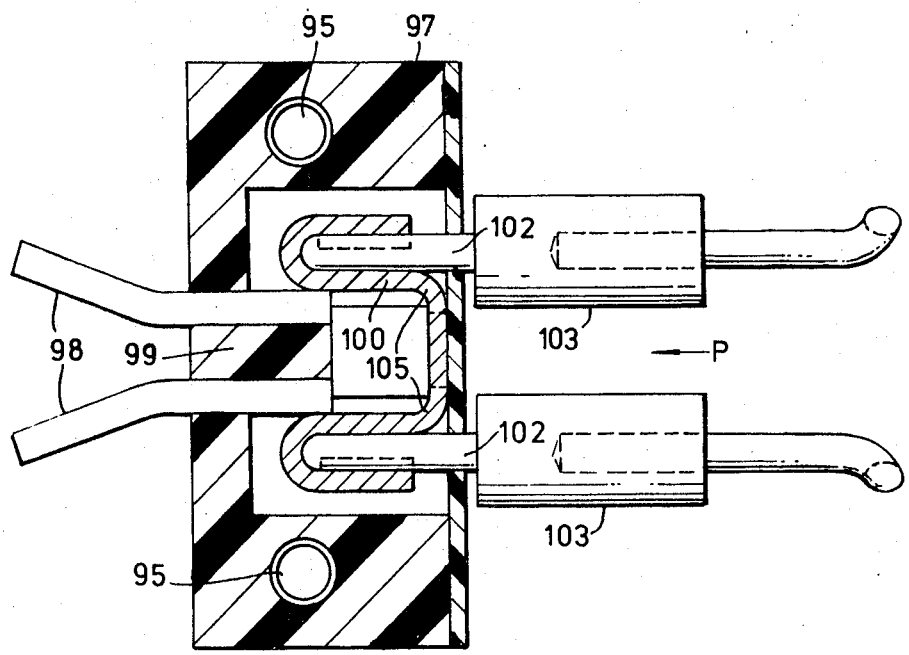

The limit switch is shown in greater detail in FIG. 10. It consists of an insulating housing 97 into which two conductors 98 lead to form a pair of fixed contacts one on each side of an insulating column 99. The movable contacts of the limit switch are formed by the sides of a U-shaped member 100 which normally bear under their own resiliency against the fixed contacts. The sides of this U-shaped member 100 are bent back along themselves to form a socket into which fit feelers 102 which are of insulating material or as illustrated incorporate insulating material 103. These feelers project out from the limit switch and are bent to pass through the cover plate 89 into the path of the pads 81. The ends of the feelers are spaced apart by a distance equal to the thickness of the brake disc and normally twice the minimum thickness of lining permissible and are symmetrically disposed about the central plane of the brake disc. On the brake pads wearing, one or both pads will contact an end of a feeler 102 which will flex the respective side of the U-shaped member 100 about the corner 105 at the base of the U-shape away from the respective fixed contact.

It will be apparent that the fixed contacts should not be normally in contact with the sides of the U-shaped member along the entire length thereof but only in contact with a short length of the U-shaped member at the free ends of the sides of this member. It is possible for the column 99 to extend beyond the fixed contacts and to be used to locate the U-shaped member. However, it is preferred that the U-shaped member should have lugs projecting from its sides which can be bolted to another part of the housing 97.

The limit switch shown in FIG. 10 can be used for a range of disc brakes by adjustment of the feelers for example by bending them and by suitably adapting the cover plate. The limit switch could be applied to drum brakes by having the feelers engaging in holes in the brake shoes. It would also be possible to design the sides of the U-member to act in an over-center manner or to have an insulating resilient member for entering between contacts of a cooperating pair so that opening of a contact pair was not cancelled by release of the brake.

It will however be appreciated that other forms of the invention can be applied to disc brakes for example an indicator could be bridged between the brake pads.

The wear on a single pad could be sensed by using a single feeler and a suitably modified switch.

The circuit of FIG. 6 is applicable to the disc brake indicators illustrated in FIGS. 7 to 10. However modifications to this circuit can be used to reduce the current consumed.

Figures 11, 12:
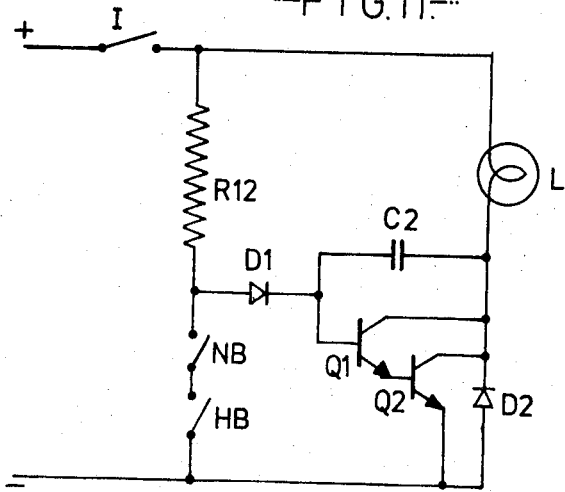

FIG. 11 illustrates three variations namely the use of an electronic relay, the use of a capacitor as a delay, and the possible use of a test switch.

The electronic relay comprises a resistor R12 in series with the wear indicators NB represented by a single contact pair. The voltage dropped across this resistor R12 is fed through a diode D1 to a Darlington pair of transistors $Q_1$, $Q_2$ used to switch a lamp L. A capacitor C2 is connected to the input of the Darlington pair, so that on initially switching on the ignition switch I capacitor C2 charges and in charging causes transistors Q1 and Q2 to conduct thereby turning on the lamp. During charging of the capacitor C2 the charging current through the capacitor C2 decays and in doing so turns off the Darlington pair, the lamp L being thereby extinguished. A diode D2 may be used to protect the Darlington pair against supply transients.

As an alternative to, or as an addition to, the delay provision provided by the diode D1 and the capacitor C2, a manually operable test switch, which may be incorporated in the hand brake HB, can be provided in series with the other wear indicators. This test switch would be operated to check the correct functioning of the circuit.

The embodiment of FIG. 12 illustrates a continuously self-monitoring supervisory circuit. The voltage from the car battery is fed through the ignition switch I across a bridge consisting of impedance R1 to R4. The wear indicators NB are connected in series with a resistor R3 in one of the arms of the bridge. The output of the bridge is fed to the bases of two transistors Q1 and Q2 having a common emitter resistor R7 but having separate collector resistors R5 and R6. It will be appreciated that when the bridge is unbalanced by operation of one of the wear indicators, one of the transistors Q1 and Q2 will be switched off or on depending on the bias and the circuit arrangement to feed a signal through a diode D3 or D4 to operate a Darlington pair of transistors Q3 and Q4. The wear indicators have a finite resistance when closed and are also disposed in the respective arm relative to the resistor R3 in such a way that a short circuit on one of the wear indicators causes the other of the transistors Q1 and Q2 to switch off the Darlington pair of transistors Q3 and Q4. A capacitor C2 in series with a resistance R8 can be used to provide an automatic warning (when the ignition is switched on) so that the system is checked for integrity of the lamp L.

Connected in series with the wear indicators can be one or more other sensors for supervising another element such as the clutch fluid reservoir, the gear box, the sump, the petrol tank, differential gear box, the brake fluid reservoir, and parts of the vehicle electrical system which can be supervised by electrical contacts.

I claim:
1. A vehicle brake lining wear indication system in and for a vehicle having a plurality of brakes, each having a movable lining carrying member and an indicator, each indicator comprising at least one pair of contacts, means for biassing the pair of contacts together with the contacts being separable by application of a force in opposition to the bias, and means whereby the pair of contacts is forced to separate in response to movement of the lining carrying member during brake actuation by more than a predetermined amount, the system comprising the indicators, a series circuit including the indicators, and a display means associated with the series circuit and responsive to a break therein.

2. An indication system according to claim 1 for and in a vehicle in which at least some of the brakes comprise a rotor, a fixed part, and at least two parts which carry the friction linings, and an actuator which moves said at least two parts when the brake is operated, at least portions of two of the above-mentioned parts separating relative to each other when the brake is operated, wherein the pair of contacts, the biassing means, and the separating means of one indicator form a tie adapted to be fitted between said portions, in the separating means there being a lost motion device so arranged that on separation of said portions the lost motion is taken up before the contacts are separated.

3. An indication system according to claim 2 for use when at least some of the brakes are drum brakes and wherein the relevant ties have length adjustment means.

4. An indication system according to claim 3 wherein each relevant tie incorporates a rod forming part of the lost motion device and the length adjustment means is a helical adjustable stop to limit the amount of lost motion and thus the length of the extended tie.

5. An indication system according to claim 1, wherein said at least one pair of contacts comprises two contacts which are permanently connected to the series circuit and which are not relatively movable and a bridging connection which provides complementary contacts to form two pairs of contacts, the bridging connection being carried in an articulated manner and being subject to the biassing means.

6. An indication system according to claim 5, wherein the contacts are contained in a housing, the bridging connection being carried by means of a knuckle joint from a resilient block which is slidable in the housing against the force exerted by the biassing means.

7. An indication system according to claim 1, wherein the at least one pair of contacts comprise a fixed contact and a movable contact, and the biassing means comprises a resilient member on which the movable contact is provided, and the separating means comprises an insulated feeler.

8. An indication system according to claim 7, in and for a vehicle using disc brakes, each disc brake comprising a housing, at least one actuator, a rotor, and opposed friction pads, the friction pads having a defined path of movement, comprising for each disc brake a switch body containing the respective at least one pair of contacts and adapted to be mounted on the housing, and the at least one insulated feeler having a free end extending into the movement path whereby on abutment of the end with a friction pad the feeler is moved, the feeler being connected with one of said contacts to separate it from its complementary contact.

9. An indication system according to claim 8 wherein each switch body contains two fixed contacts each with its complementary movable contact and both movable contacts are provided on the same resilient member which is U-shaped with one movable contact being on each leg thereof and each leg being bent back on itself to form a socket, there being two feelers each fitting into a respective one of said sockets.

10. An indication system according to claim 1 wherein also connected in the series circuit are normally closed contacts of at least one other indicator monitoring the condition of another element affecting vehicle safety.

11. A system according to claim 1 wherein the display means comprises a relay which incorporates delay means whereby the relay does not operate immediately on switching on the system but gives a false indication there is a fault in order to check the circuit.

12. A system according to claim 1 wherein the display means includes a bridge circuit in one arm of which are located the contacts.

13. In and for a vehicle brake system having at least one brake consisting of a support, a rotor, at least one friction lining carrying member, this member being mounted from the support, and an actuator for moving the member a sufficient distance for it to contact the rotor to achieve a brake actuation, which sufficient distance if it exceeds a preselected distance implies the need for at least adjustment of the member; an indicator comprising a pair of separable electrical contacts, means for resiliently biassing the contacts into engagement with each other with the contacts being separable by application of a force in opposition to the bias, means responsive to movement of the member by more than the preselected distance and arranged to move the contacts apart, and indicator means energized when the contacts are moved apart.

14. An indicator according to claim 13, wherein said responsive means is disposed so that it is abutted by the member when the preselected distance is exceeded.

15. An indicator according to claim 13 wherein said responsive means is connected to the member by a lost motion device.

* * * * *